[12] United States Patent  (10) Patent No.: US 9,478,786 B2
Lim et al.  (45) Date of Patent: Oct. 25, 2016

(54) HIGH-VOLTAGE BATTERY WITH INTEGRATED CELL CONNECTOR

(75) Inventors: Jae Hwan Lim, Daejeon (KR); Soo Yeup Jang, Daejeon (KR)

(73) Assignee: SK INNOVATION CO., LTD. (KR)

( * ) Notice: Subject to any disclaimer, the term of this patent is extended or adjusted under 35 U.S.C. 154(b) by 285 days.

(21) Appl. No.: 13/819,596

(22) PCT Filed: Sep. 1, 2011

(86) PCT No.: PCT/KR2011/006500
§ 371 (c)(1),
(2), (4) Date: Feb. 27, 2013

(87) PCT Pub. No.: WO2012/030182
PCT Pub. Date: Mar. 8, 2012

(65) Prior Publication Data
US 2013/0157112 A1 Jun. 20, 2013

(30) Foreign Application Priority Data
Sep. 1, 2010 (KR) .................... 10-2010-0085555

(51) Int. Cl.
*H01M 4/00* (2006.01)
*H01M 2/20* (2006.01)
*H01M 2/10* (2006.01)
*H01M 2/30* (2006.01)
*H01M 10/42* (2006.01)

(52) U.S. Cl.
CPC ........... *H01M 2/202* (2013.01); *H01M 2/1077* (2013.01); *H01M 2/206* (2013.01); *H01M 2/30* (2013.01); *H01M 10/425* (2013.01); *H01M 2220/20* (2013.01)

(58) Field of Classification Search
CPC .................................................. H01M 10/02
See application file for complete search history.

(56) References Cited

U.S. PATENT DOCUMENTS

| 7,563,137 | B1 | 7/2009 | Koetting et al. |
| 2004/0253867 | A1 | 12/2004 | Matsumoto |
| 2007/0054561 | A1 | 3/2007 | Gutman et al. |

(Continued)

FOREIGN PATENT DOCUMENTS

| CN | 101490871 | 7/2009 |
| JP | 2000123802 | 4/2000 |
| JP | 2004031295 | 1/2004 |

(Continued)

OTHER PUBLICATIONS

International Search Report—PCT/KR2011/006500 dated Mar. 9, 2012.

(Continued)

*Primary Examiner* — Jacob Marks
(74) *Attorney, Agent, or Firm* — Cantor Colburn LLP

(57) ABSTRACT

Provided is a high-voltage battery with an integrated connector. The high-voltage battery includes cells, support members, a housing, the integrated connector and a BMS. A lower connection member is provided on one side of each support member and has protrusions made of electrical conductors. The protrusions come into contact with corresponding electrodes of the cells. A cell assembly formed by the arrangement of the cells and the supports is inserted into the housing. The integrated connector is connected to the lower connection members of the support members so as to mechanically and electrically connect the cells to each other.

2 Claims, 8 Drawing Sheets

(56) References Cited

U.S. PATENT DOCUMENTS

2009/0323293 A1    12/2009  Koetting et al.
2011/0294000 A1*   12/2011  Kim et al. .................. 429/176

FOREIGN PATENT DOCUMENTS

| JP | 2010097722 | 4/2010 |
| KR | 1020090000301 | 1/2009 |
| WO | 2007027603 | 3/2007 |
| WO | 2007132991 | 11/2007 |
| WO | 2009038320 | 3/2009 |
| WO | 2009057894 | 5/2009 |
| WO | 2009107557 | 9/2009 |

OTHER PUBLICATIONS

European Search Report—European Application No. 11822157.1 issued on Apr. 11, 2014, citing WO 2009/038320, US2009/323293, U.S. Pat. No. 7,563,137 and WO 2009/057894.

* cited by examiner prior art prior art

HIGH-VOLTAGE BATTERY WITH INTEGRATED CELL CONNECTOR

TECHNICAL FIELD

The present invention relates to a high-voltage battery with an integrated cell connector.

BACKGROUND ART

Vehicles which run on internal combustion engines using gasoline or diesel oil as their fuel produce severe environmental pollution, such as air pollution. Thus, recently, to reduce environmental pollution, development of electric vehicles or hybrid electric vehicles has become more active. Cells are the power sources of such electric and hybrid vehicles. High-power secondary cells using nonaqueous electrolytes having high energy density were recently developed. Further, high-capacity high-voltage batteries which comprise high-power secondary cells connected in series are generally used in machines, such as motors of electric vehicles or the like, which need high power.

Typically, a single high-capacity high-voltage battery includes a plurality of secondary cells which are connected to each other in series. Furthermore, the high-voltage battery further includes a BMS (battery management system). The BMS will be briefly explained below. In the case of such a battery, in particular, a battery for an HEV (hybrid electric vehicle), from several to several tens of secondary cells alternately perform charging and discharging. Hence, management of the battery including the operation of controlling such charging and discharging is required so that the battery is maintained in a state of optimal operation. For this, the BMS for controlling the general conditions of the battery is used. Such a BMS senses the voltage, current, temperature, etc. of the battery, determines a current SOC (state of charge) of the battery, and controls the SOC to keep the fuel efficiency of the vehicle at its maximum.

As mentioned above, the high-voltage battery includes the cells, a connection structure for connecting the cells to each other, and the BMS connected to the connection structure.

FIGS. 1 and 2 illustrate a connection structure of a conventional high-voltage battery. This conventional high-voltage battery includes a plurality of cells which are connected to each other in series. In this conventional art, as shown in FIGS. 1 and 2, upper connection members and lower connection members are used to mechanically and electrically connect the tabs of the cells to each other. The tab of each cell is disposed between the corresponding upper and lower connection members. In detail, after the tab of each cell is disposed between the upper connection member and the lower connection member, a bolt attached to the lower connection member passes through a hole of the upper connection member and is tightened with a nut above the upper connection member. Thereby, the cells are mechanically and electrically connected to each other.

However, in the conventional connection structure of the high-voltage battery, a large number of connection units corresponding to the number of the tabs of the cells are required. Furthermore, each connection unit itself includes a plurality of parts. Thus, due to an increased number of parts, the production cost increases, and the process of assembling the parts is complicated. Moreover, such a complex connection structure makes the entire system complex. In addition, due to the large number of parts, the volume of the connection structure increases, thus increasing the entire volume of the high-voltage battery.

DISCLOSURE OF INVENTION

Technical Problem

Accordingly, the present invention has been made keeping in mind the above problems occurring in the prior art, and an object of the present invention is to provide a high-voltage battery which is provided with an integrated cell connector, thus simplifying an entire battery system, making the battery compact, and facilitating the assembly process.

Solution to Problem

In order to accomplish the above object, the present invention provides a high-voltage battery, including: a plurality of cells; a plurality of support members interposed between the cells to support the cells and arranged in such a way that each support member is between two adjacent cells, each of the support members being made of an electrical insulation material, with a lower connection member provided on one side of each of the support members, the lower connection member having protrusions made of electrical conductors, the protrusions coming into contact with corresponding electrodes of the cells and protruding upwards with respect to the cells; a housing into which a cell assembly formed by the arrangement of the cells and the supports is inserted; an integrated connector connected to the lower connection members of the support members so as to mechanically and electrically connect the cells to each other; and a BMS (battery management system) electrically connected to the integrated connector, the BMS electrically controlling the cells.

The integrated connector may include: a connection block disposed on and coupled to an upper end of the cell assembly formed by the arrangement of the cells and the supports, the connection block being made of an electrical insulation material and having a planar shape; a plurality of upper connection members provided on a lower surface of the connection block at positions corresponding to the respective lower connection members, each of the upper connection members being made of an electrical conductor; and signal wires connecting the upper connection members to the BMS, each of the signal wires being made of an electrically conductive material.

Each of the protrusions of the lower connection members may have a screw shape. Through holes may be formed in the upper connection members and the connection block at positions corresponding to the protrusions. The protrusions may be threaded into the corresponding through holes.

Advantageous Effects of Invention

As described above, a high-voltage battery according to the present invention has an integrated cell connection structure. Thus, the present invention can solve several problems of the conventional cell connection structure which are caused by a large number of parts and the fact that each cell needs an individual cell connection structure. In detail, because the cell connection structure of the present invention is very much simpler than that of the conventional art, the number of parts is markedly reduced, and the assembly process is simplified. Thus, the production cost can be reduced, and the time the production process takes can also be markedly reduced. Furthermore, due to the simple cell connection structure of the present invention, the volume of the cell connection structure is reduced. Thereby, the volume of the high-voltage battery itself can be reduced. Therefore, the high-voltage battery can be more easily manufactured in a compact size.

Moreover, despite the simplified cell connection structure, the coupling durability of the structure can be markedly enhanced compared to that of the conventional art. Eventually, the durability of the high-voltage battery itself can be markedly enhanced. In addition, an electrical connection circuit for connecting the cells can be simplified compared to that of the conventional art. Thereby, electrical control of the high-voltage battery can be further facilitated.

BEST MODE FOR CARRYING OUT THE INVENTION

Hereinafter, a high-voltage battery with an integrated cell connector according to the present invention will be described in detail with reference to the attached drawings.

Figure 3:
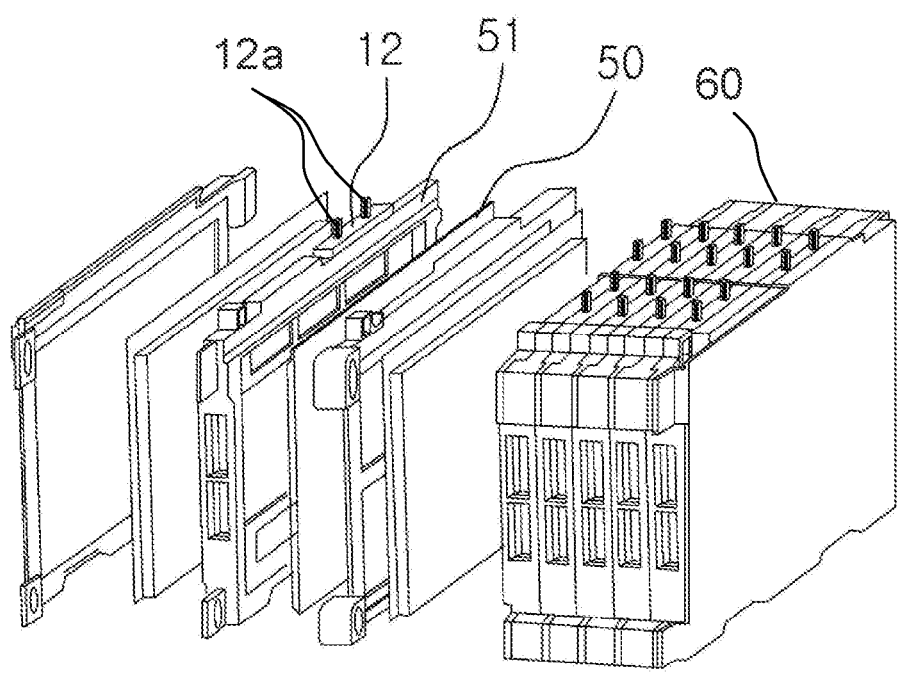
FIGS. 3 and 4 illustrate a high-voltage battery with an integrated cell connector, according to the present invention.
Figure 4:
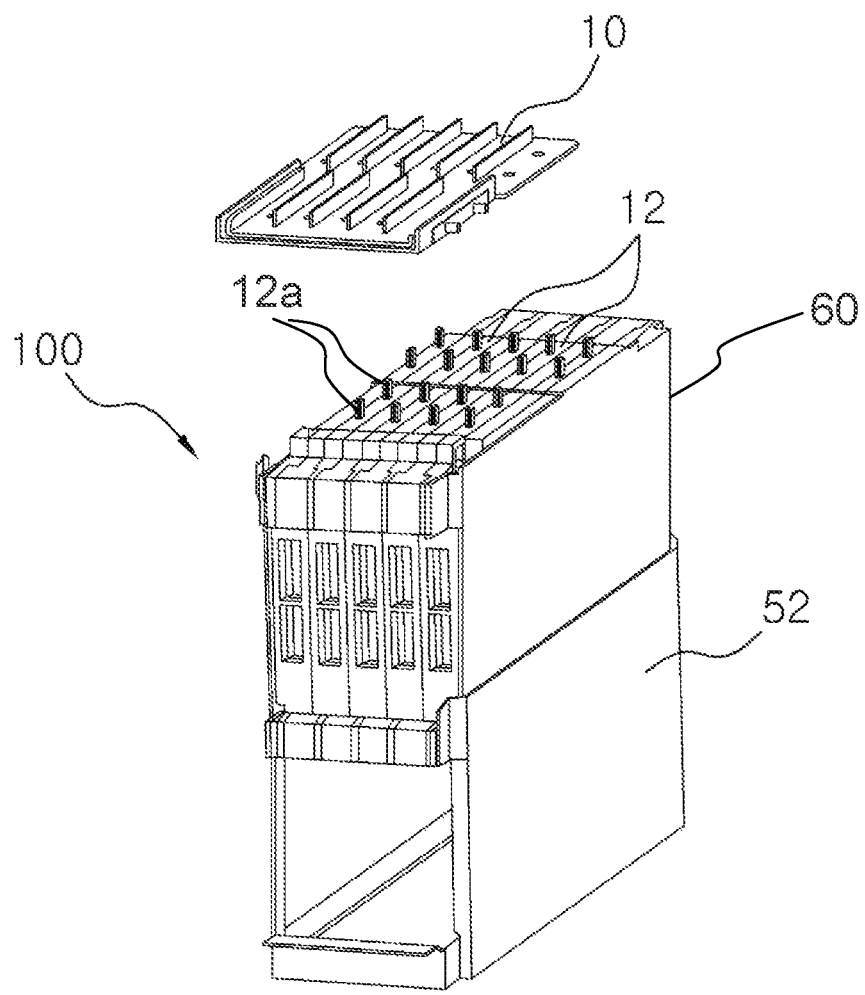
Figure 9:
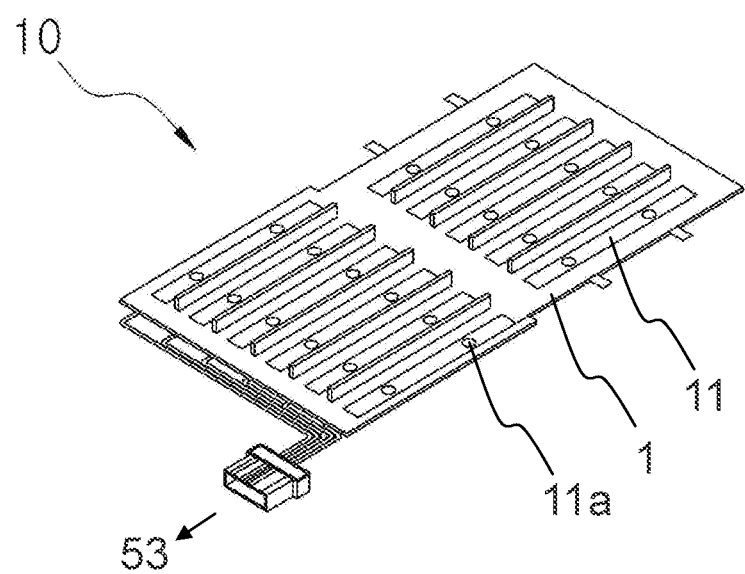

FIGS. 3 and 4 illustrate a high-voltage battery with an integrated cell connector, according to the present invention. As shown in the drawings, the high-voltage battery 100 according to the present invention includes a plurality of cells 50, support members 51, a housing 52 and a BMS 53. The support members 51 are interposed between the cells 50 in such a way that one support member 51 is always between two adjacent cells 50. As shown in FIG. 3, the support member has a form of frame. Each support member 51 has a lower connection member 12 provided with protrusions 12a which come into contact with electrodes of the cells 50 and protrude upwards with respect to the cells 50. The housing 52 forms the appearance of the battery and contains the cells 50 therein to protect them. The integrated connector 10 mechanically and electrically connects the cells 50 to each other. The BMS 53 is electrically connected to the integrated connector 10 to electrically control the cells 50, as shown in FIG. 9. The elements will be explained in detail below.

The high-voltage battery 100 is characterized in that each of the support members 51 interposed between the cells 50 includes the lower connection member 12 to facilitate the electrical connection between the cells 50. Generally, to construct the high-voltage battery, support members are used to support cells and to keep them at the correct positions in their arrangement. In the present invention, the support members 51 are provided with the lower connection members 12 so that the electrodes of the cells 50 can be electrically connected to external elements by the lower connection members 12. That is, each support member 51 is made of an electrical insulation material and is interposed between two adjacent cells 50. Furthermore, as shown in FIG. 3, each support member 51 has on one side thereof the lower connection member 12 which is provided with the protrusions 12a that protrude upwards with respect to the cells 50. The protrusions 12a are made of electrical conductors and are brought into contact with the corresponding electrodes of the cells 50. Thereby, the cells 50 can be electrically connected to external elements.

AS shown in FIG. 3, the cells 50 and the support members 51 provided with the lower connection members 12 alternate and are arranged in a stacked shape to form a single cell assembly 60. As shown in FIG. 4, the cell assembly 60 is inserted into the housing 52 and supported by it. In other words, the housing 52 contains therein the cell assembly including the cells 50 and the support members 51 that are alternately arranged. The housing 52 functions to protect the cell assembly from the outside and to support it so that the cell assembly 60 is reliably maintained in the assembled state.

As shown in FIG. 4, in the high-voltage battery 100, the integrated connector 10 is coupled to the upper end of the cell assembly including the cells 50 and the support members 51. The integrated connector 10 is a key element of the structure of the high-voltage battery 100 and will be described in detail below. Although not shown in FIG. 3 or 4, the high-voltage battery 100 includes the BMS 53 (as shown in FIG. 9) which is electrically connected to the integrated connector 10 to electrically control the cells 50.

The integrated connector 10 is connected to the lower connection member 12 so that the cells 50 are mechanically and electrically connected to each other, as shown in FIG. 4. In detail, the integrated connector 10 is mechanically and electrically brought into contact with the lower connection members 12 that are connected to the electrodes of the cells 50. Eventually, the cells 50 are connected to each other in series by the single element.

Figure 1:
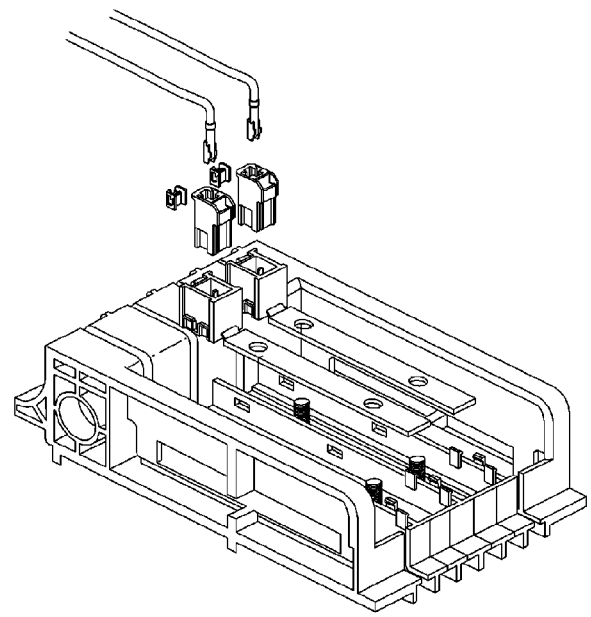
FIGS. 1 and 2 illustrate a cell connector of a conventional high-voltage battery.
Figure 2:
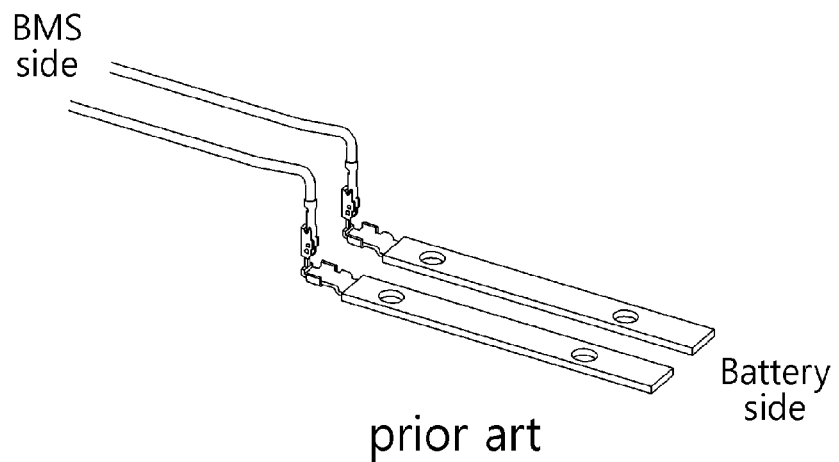
Figure 5:
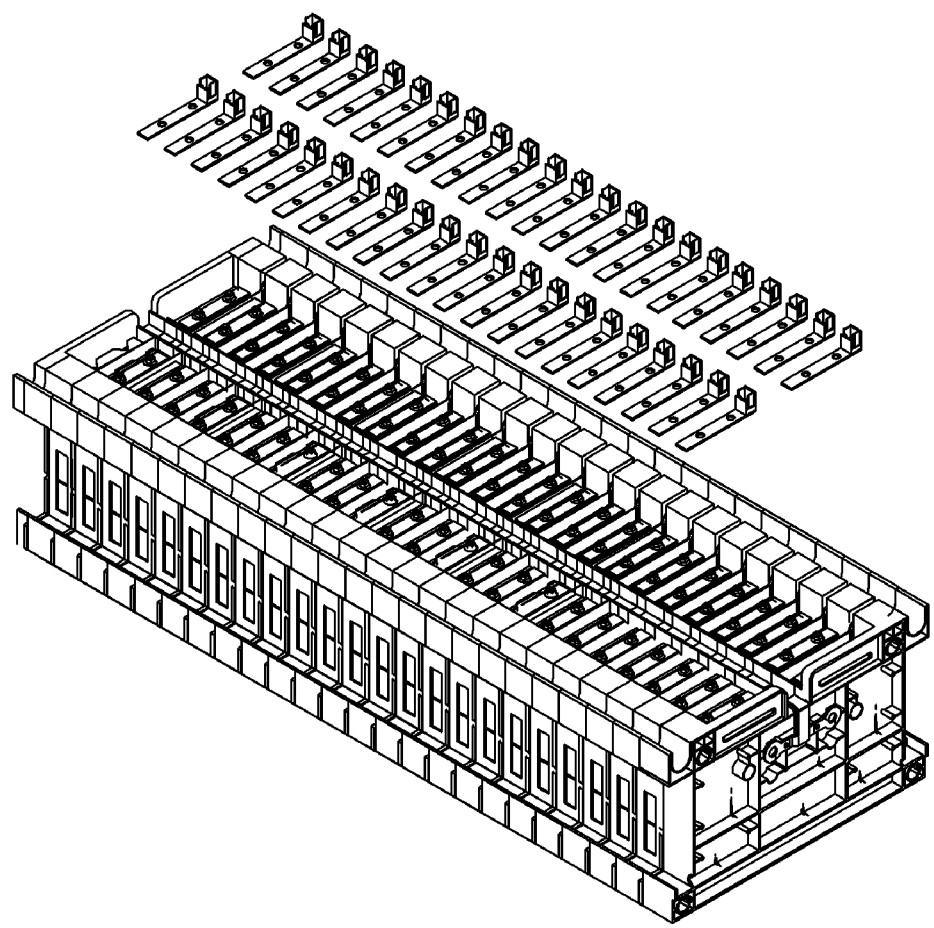
FIGS. 5 and 6 are views comparing a connection structure of the high-voltage battery of the present invention to that of the conventional technique.

In the case of the conventional connection structure shown in FIGS. 1 and 2, a lower connection member is connected to each cell, and an upper connection member is connected to each lower connection member. Therefore, the same numbers of lower and upper connection members as the number of cells are required, thus increasing the number of total parts. Furthermore, because a large number of parts must be assembled together, much time and effort is required for the assembly process. FIG. 5 illustrates a high-voltage battery using the conventional connection structure. As shown in FIG. 5, the number of connection members required is the same as the number of cells. In detail, the number of cells of the embodiment of FIG. 5 is seventy two. Therefore, as shown in FIGS. 1 and 2, seventy two lower connection members that are directly connected to the respective cells are also required. Further, there are seventy two upper connection members that are connected to the respective lower connection member. As such, the conventional connection structure requires a large number of parts, making the process of assembling the parts complex. Furthermore, there is a problem of a high error rate when connecting the connection members to the respective cells. That is, there are several problems with the conventional connection structure.

Figure 6:
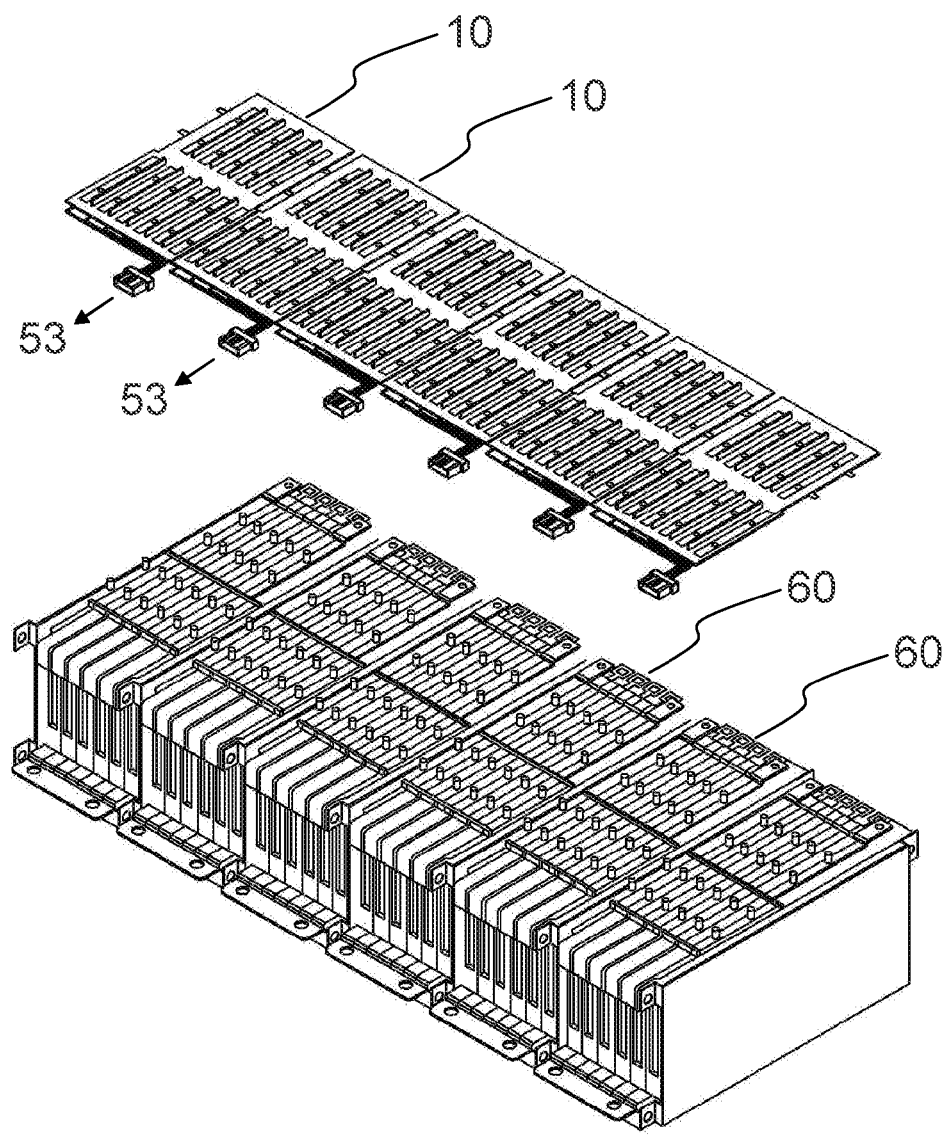

However, in the case of the present invention, because the lower connection members 12 are provided on the support members 51 that are interposed between the cells 50, a separate process is not required to assemble the lower connection members 12 to the cells 50. Further, the support members 51 themselves are parts that are typically used in general high-voltage batteries. Thus, the present invention does not increase the number of parts or processes. In addition, to connect the cells 50 to each other in series, the integrated connector 10 that comprises a single part is coupled to the upper end of the cell assembly 60 that includes the cells 50 and the support members 51. Therefore, compared to the conventional art, the assembly process is markedly simplified. Thereby, the labor time and effort can also be markedly reduced. FIG. 6 illustrates the high-voltage battery having the integrated connector 10 according to the present invention. As shown in FIG. 6, in the present invention, only six integrated connectors 10 are used despite the same number of cells as that of the conventional high-voltage battery of FIG. 5. Furthermore, although the embodiment of FIG. 6 is illustrated as being configured such that twelve cells are connected to each other by the single integrated connector, the number of integrated connectors which can be connected to each other by the single integrated connector may be changed depending on the intension of a designer, the purpose of use, the surrounding conditions, etc. Of course, the present invention is not limited to the embodiment of FIG. 6.

Figure 7:
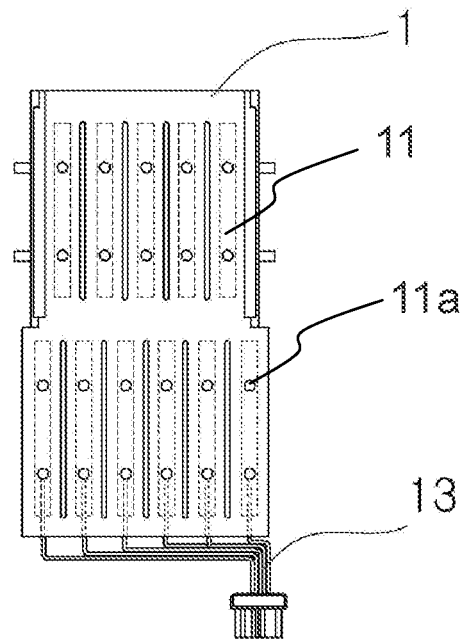
FIGS. 7 through 9 are detailed views showing the integrated cell connector according to the present invention.
Figure 8:
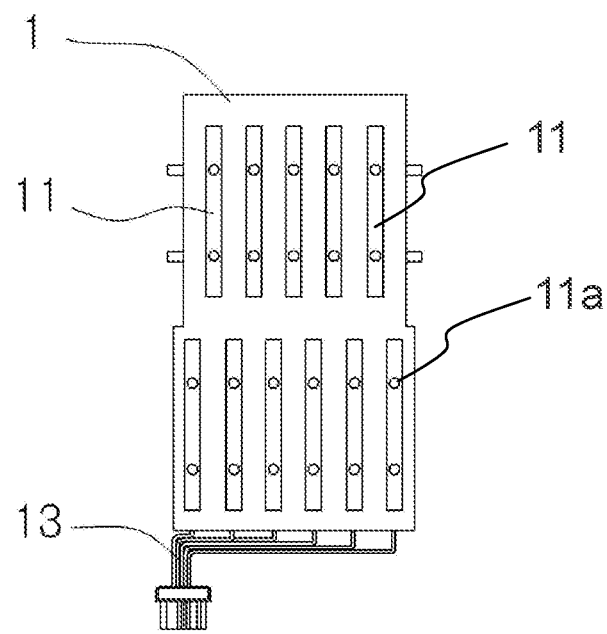

FIGS. 7 through 9 illustrate the detailed structure of the integrated connector 10. FIG. 7 is a view showing an upper surface of the integrated connector 10. FIG. 8 is a view showing a lower surface of the integrated connector 10. FIG. 9 is a perspective view of the integrated connector 10. Here, the term "upper" and "lower" are determined based on the high-voltage battery 100. In other words, the term "lower surface" refers to a surface of the side that comes into direct contact with the cell assembly including the cells 50 and the support members 51. The term "upper surface" refers to a surface of the side that is to be exposed to the outside after the integrated connector 10 is coupled to the cell assembly. In FIGS. 7 and 9, the structure of the lower surface that cannot be observed from the upper surface is designated by dashed lines.

As shown in FIGS. 7 through 9, the integrated connector 10 includes a connection block 1, upper connection members 11 and signal wires 13. These elements will be explained in detail below.

The connection block 1 is made of an electrical insulation material and has a planar shape. Further, the connection block 1 forms the entire shape of the integrated connector 10. As shown in FIG. 4, the connection block 1 is disposed on and coupled to the upper end of the cell assembly including the cells 50 and the support members 51.

As shown in FIG. 8, the upper connection members 11 are provided on the lower surface of the connection block 1. The upper connection members 11 are made of electrical conductors and are disposed on the lower surface of the connection block 1 at positions corresponding to the respective lower connection members 12. Further, the signal wires 13 are made of electrical conductive material and are formed on the connection block 1 to connect the upper connection members 11 to the BMS 53.

Here, the connection between each upper connection member 11 and the corresponding lower connection member 12 can be embodied by any type of structure, so long as the two members can come into contact with each other and be electrically connected together. In the embodiment shown in the drawings, each of the protrusions 12a of the lower connection members 12 has a screw shape. Through holes 11a are formed in the upper connection members 11 and the connection block 1 at positions corresponding to the respective protrusions 12a of the lower connection members 12. The protrusions 12a are threaded into the corresponding through holes 11a so that the lower connection members 12 are connected to the corresponding upper connection members 11. Of course, the present invention is not limited to this structure.

As such, when the upper connection members 11 provided on the connection block 1 are brought into contact with the corresponding lower connection members 12 that are provided on the respective support members 51 interposed between the cells 50 and are connected to the corresponding electrodes of the cells 50 to connect the cells 50 to the external elements, the cells 50 are electrically connected to each other by the signal wires 13 formed on the connection block 1. In addition, the cells 50 are also connected to the BMS 53 so that the cells 50 can be under the control of the BMS 53. Depending on the arrangement of the signal wires 13 or the circuit construction of the BMS 53, the design of the connection structure of the cells 50 can be freely changed. Because the present invention proposes the high-voltage battery, the signal wires 13 are configured in such a way that the cells 50 are connected in series.

Figure 10:
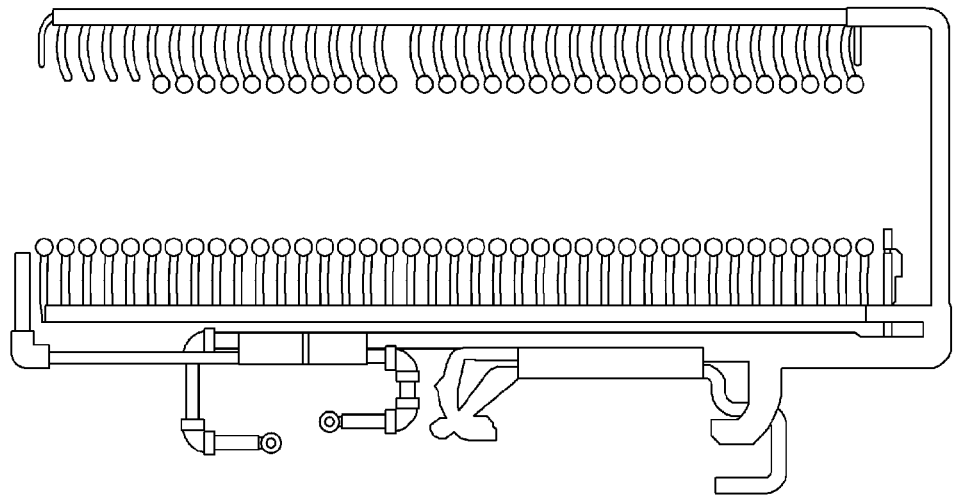
FIGS. 10 and 11 are views comparing a wiring structure of the high-voltage battery of the present invention to that of the conventional technique.
Figure 11:
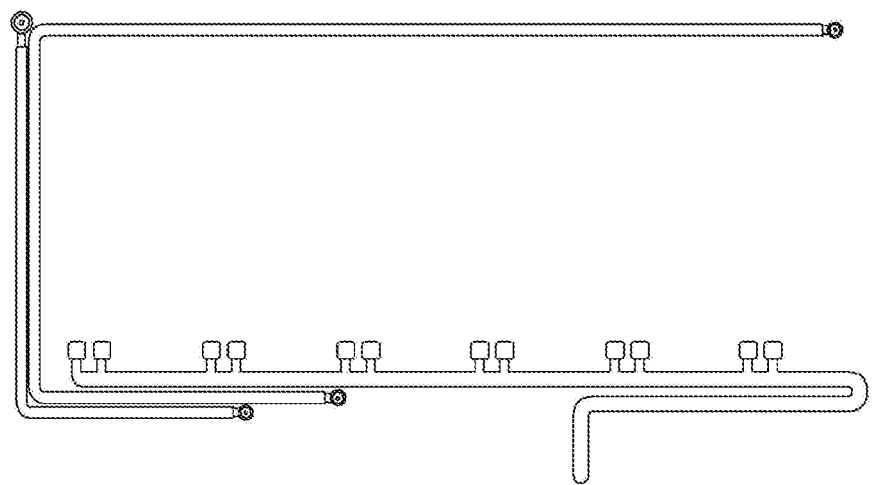

FIGS. 10 and 11 compare the wiring structure of the high-voltage battery of the present invention to that of the conventional technique. FIG. 10 illustrates the wiring structure of the high-voltage battery having the conventional connection structure shown in FIG. 5. As shown in FIG. 10, it can be understood that the wiring structure is very complicated, because the cell connection structure itself is very complex. However, in the case of the high-voltage battery of the present invention, the signal wires 13 are formed on the integrated connector 10 that connects the cells to each other, with only one terminal extending outside the integrated connector 10. Therefore, as shown in FIG. 11, the wiring structure can be markedly simplified compared to that of the conventional art. As such, in the high-voltage battery of the present invention, the wiring structure can be markedly improved by virtue of an improvement in the cell connection structure. Thereby, the design and assembly can also be facilitated.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A high-voltage battery, comprising:
   a plurality of cells, each cell having a plate shape and electrodes protruding upwards;
   a plurality of support members each interposed between two adjacent cells to support the cells, each of the support members being made of an electrical insulation material;
   a plurality of lower connection members each provided on top of each of the support members, the lower connection member having protrusions made of an electrical conduction material, the protrusions protruding upwards with respect to the cells and in contact with the electrodes of the cells, wherein the cells and the support members having the lower connection members stack alternately and form a cell assembly;
   a housing into which the cell assembly is inserted;
   an integrated connector installed on the lower connection members of the support members so as to mechanically and electrically connect the cells to each other, wherein the integrated connector includes: a connection block made of an electrical insulation material and having a planar shape; a plurality of upper connection members formed in the connection block and made of an electrical conduction material, each of the upper connection members being positioned at and electrically in contact with each corresponding lower connection member; and a signal wire made of an electrical conduction material and connected to each of the upper connection members; and a BMS (battery management system) electrically connected to the integrated connector through the electrical wire, the BMS electrically controlling the cells.

2. The high-voltage battery as set forth in claim 1, wherein each of the protrusions of the lower connection members has a screw shape, and the integrated connector further includes through holes formed in the upper connection members and the protrusions of the lower connection members being inserted into the through holes.

* * * * *